United States Patent [19]

Yuda

[11] 4,389,759
[45] Jun. 28, 1983

[54] RADIATOR GRILLE FIXING STRUCTURE

[75] Inventor: Takuo Yuda, Yokohama, Japan

[73] Assignee: Nifco Inc., Tokyo, Japan

[21] Appl. No.: 185,811

[22] Filed: Sep. 10, 1980

[30] Foreign Application Priority Data

Sep. 11, 1979 [JP] Japan .......................... 54-124667[U]

[51] Int. Cl.³ ............................................. A44B 17/00
[52] U.S. Cl. ......................................... 24/214; 24/335;
24/213 R; 52/507; 248/221.4
[58] Field of Search ...................... 24/335, 336, 213 R,
24/203 R, 204, 214, 213 CS; 248/221.4, 226.5;
52/507, 511

[56] References Cited

U.S. PATENT DOCUMENTS

| | | | |
|---|---|---|---|
| 3,191,135 | 6/1965 | Hazelquist | 248/221.4 |
| 3,996,500 | 12/1976 | Coules | 24/335 |
| 4,094,483 | 6/1978 | Busch | 248/221.4 |
| 4,114,338 | 9/1978 | Ito | 52/507 |
| 4,168,067 | 9/1979 | Wiczer | 248/221.4 |
| 4,169,303 | 10/1979 | Lemelson | 24/204 |
| 4,261,151 | 4/1981 | Ito | 52/507 |
| 4,310,135 | 1/1982 | Dobson | 228/221.4 |

Primary Examiner—Robert A. Hafer
Attorney, Agent, or Firm—Jerold M. Forsberg; Thomas W. Buckman

[57] ABSTRACT

A radiator grille fixing structure comprises a plurality of fasteners which are each composed of a base plate and engaging means formed one each on the opposite sides of the base plate, with at least one of the two engaging means containing a shank portion of increased wall thickness and a flexible arm extended from the leading end of the shank portion and provided with an engaging step portion. In this structure, at least one of the plurality of fasteners is disposed in a direction opposite the direction in which the remaining fasteners are disposed. This fixing structure, when used as the medium for the union between a radiator grille and an automobile body, withstands all external forces exerted upon the radiator grille during the travel of the automobile.

1 Claim, 8 Drawing Figures

U.S. Patent  Jun. 28, 1983  Sheet 1 of 2  4,389,759
Fig_1
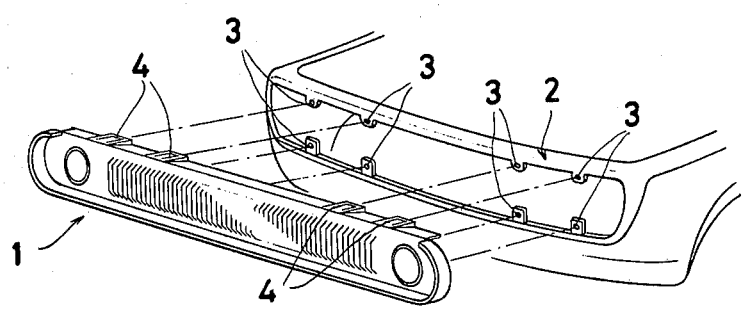
Fig_2
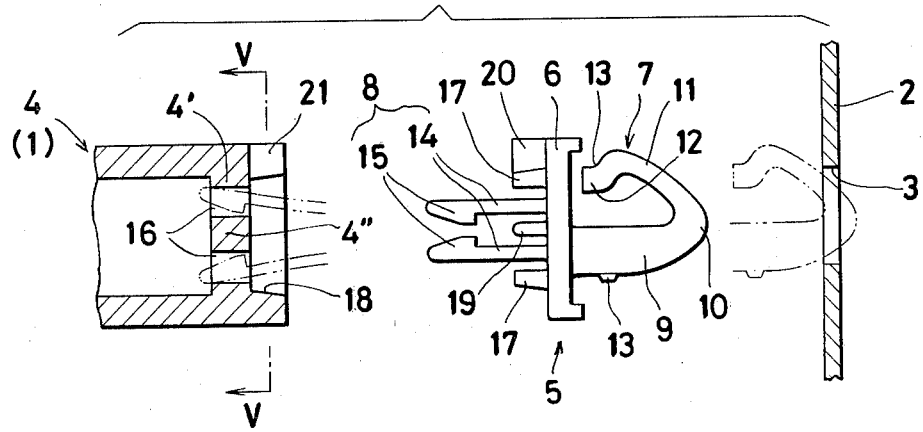
Fig_3
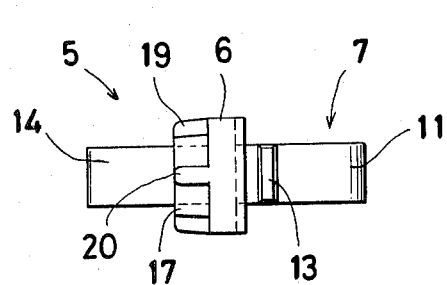
Fig_4
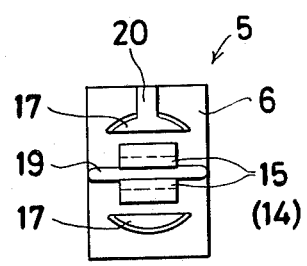

RADIATOR GRILLE FIXING STRUCTURE

BACKGROUND OF THE INVENTION

This invention relates to a structure for fixing a radiator grille to the front portion of an automobile body.

In the fixing of a radiator grille to the front portion of an automobile body, a fastener which comprises means capable of being attached on one side to the radiator grille and on the other side to the automobile body has been adopted to heighten the efficiency of the fixing work. Generally, the fastener of this type possesses means for fast engagement with the radiator grille and the automobile body. With this fastener, therefore, the fixing of the radiator grille and the automobile body is accomplished by bringing this means into snapping engagement with the fitting holes bored at the matched positions of the radiator grille and the automobile body.

Where the method described above is adopted for the fixing in question, the engaging means of the fastener is naturally required to be readily insertable into the fitting holes bored one each in the radiator grille and the automobile body. To fulfill this requirement, the material and construction of the engaging means are carefully designed so that the produced engaging means will exhibit a proper degree of flexibility. Generally, a plurality of such fasteners are attached fast to peripheral locations of the radiator grille and the automobile body is fastened to these fasteners afterward. It often happens that especially the fitting holes bored at the fitting positions on the automobile body more or less deviate from their exact positions. Also for the purpose of absorbing this positional deviation, due consideration must be paid to the necessity for enabling the engaging means of the fastener to possess ample flexibility.

When such ample flexibility is imparted to the fastener, however, the force with which the radiator grille is fastened to the automobile body declines even to a point where the fastener will fail to withstand the vibrations exerted thereon by the automobile body during its travel on a particularly rough road surface. Because of these circumstances, a fastener construction which permits the attachment of the radiator grille to the automobile body to be accomplished with a simple operation and, yet, enables the union between the radiator grille and the automobile body to be retained securely has been desired.

SUMMARY OF THE INVENTION

An object of this invention is to provide a radiator grille fixing structure comprising a plurality of fasteners which, individually, are properly flexible and capable of being easily attached to given objects and, upon being attached to such objects, function cooperatively with one another to enhance the binding force with which the radiator grille and the automobile body are fastened to each other and, consequently, enable the radiator grille to be fixed securely to the automobile body.

To accomplish the object described above according to the present invention, there is provided a radiator grille fixing structure which is composed of a plurality of fasteners each comprising a base plate provided on the opposite surfaces thereof with engaging members of the two engaging members being formed of a thick-walled shank portion, having a flexible arm extended from the leading end of the shank portion and provided at the free end thereof with a fitting step portion. It is incumbent that at least one of the plurality of fasteners is disposed in a direction opposite the direction of the remaining fasteners.

The thick-walled shank portion of the engaging member retains the given object with high strength. By contrast, the fitting step portion provided on the other side of the base plate possesses proper flexibility and, therefore, exhibits lower fastening strength. When the fixing structure is used for fixing the radiator grille to the automobile body and when the fasteners of this fixing structure are disposed all in one same direction, they fail to offer sufficient resistance to the load which is exerted in a certain direction upon the radiator grille. By suitably varying the direction in which the fitting step portions are disposed, the fasteners are allowed to resist stresses exerted thereon in varying directions and keep the radiator grille in fast union with the automobile body without fail.

The other objects and characteristics of the present invention will become apparent from the further disclosure of the invention to be made hereinafter with reference to the accompanying drawing.

BRIEF EXPLANATION OF THE DRAWING

FIG. 1 is a schematic perspective view of the front portion of an automobile body, to which the fixing structure of this invention is applied.

FIG. 2 is an exploded sectioned view of one embodiment of one of the fasteners constituting the radiator grille fixing structure of the present invention.

FIG. 3 is a plan view of the same fastener.

FIG. 4 is an end view of the same fastener.

DESCRIPTION OF THE PREFERRED EMBODIMENTS

Figure 5:
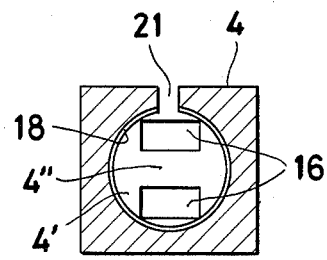
FIG. 5 is a sectioned view taken along the line V—V of the diagram of FIG. 4.

This invention relates to a radiator grille fixing structure which permits a given radiator grille to be readily fixed to an automobile body and which enables the fixed radiator grille to be held on the automobile body firmly enough to offer ample resistance to all reasonably anticipated external forces exerted upon the radiator grille.

Generally in the operation of fixing a radiator grille 1 to the front portion of an automobile body 2, the method which effects this fixing includes snap engaging means of plastic fasteners (not illustrated) fitted in advance to the corresponding fitting holes in the aforementioned automobile body.

Then the radiator grill is positioned and securement is accomplished by fasteners engaging the prepositioned plastic fasteners. Generally the engaging means are each formed of one or more arms and a catch claw formed at each leading end of the arms. During the insertion, the arms are bent out of shape so as to be slid past the respective holes. After passing through the fitting holes, the arms resume their original shape owing to their resiliency and consequently bring their respective catch claws into fast engagement with the edges of the fitting holes. To facilitate the fixing work involving the use of such fasteners, the arms are required to possess amply high flexibility. The high flexibility also provides better absorption of positional errors inevitably introduced during the fabrication of the parts of the radiator grille and the automobile body destined to participate in the radiator grille fixing operation. After the radiator grille fastened to the automobile body has been adjusted to its correct position, the fasteners are required to keep the radiator grille fast on the automobile body with enough strength to withstand all possible external forces such as vibrations which occur during the travel of the automobile. The radiator grille fixing structure of the present invention which satisfies these two requirements will be described below.

One of the fasteners 5 constituting one element of the fixing structure of this invention is illustrated in FIG. 2 as opposed on one side to the fitting hole 3 in the automobile body 2 and on the other side to the fitting position 4 of the radiator grille 1.

This fastener 5 is molded integrally of a plastic material as illustrated in FIG. 3 and FIG. 4. It comprises a base plate 6, a first engaging means 7 adapted to be brought into snapping engagement with a fitting hole 3 in the automobile body 2 and a second engaging means 8 adapted to be brought into snapping engagement with a fitting position 4 in the radiator grille, with the two engaging means extended from the opposite surfaces of the base plate 6.

The first engaging means 7 possesses a tough, solid shank portion 9 of a relatively large wall thickness extending from one surface of the base plate 6, and the shank portion 9 is provided at its leading end with a flexible slender arm 11 curved outwardly. This slender arm 11 is provided on the outer side of its free end 12 with a stepped catch portion 13 of the kind often found in snap engaging fasteners of this type.

As described above, the first engaging means 7 as a whole forms one relatively large hook. The characteristic requirement to be fulfilled by this invention is that the arm 11 provide ample flexibility and the shank portion 9 be relatively solid enough to withstand successfully all possible external forces exerted perpendicularly to the shank portion 9.

Figure 6:
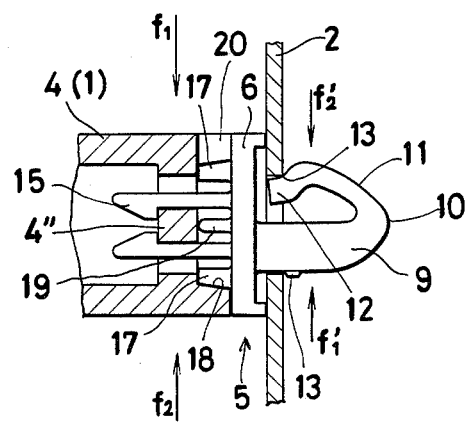
FIG. 6 is a sectioned view of the same fastener in the state assumed upon completion of the fixing of the radiator grille to the automobile body.

On the other hand, the second engaging means 8 intended for engagement with the fitting portion 4 in the radiator grille may be designed in any structure which is capable of providing fast engagement. For example, it may be formed in any of the known shapes such as, for example, an anchor, a canoe or a hook so that it will be snapped into engagement with the edge of the fitting hole when it is forced into the hole. The second engaging means 8 of the present embodiment will be briefly described by way of illustration. It comprises a pair of legs 14 raised perpendicularly from the base plate 6 and on the inner sides at the leading ends thereof with opposed hooks 15. To fasten this engaging means to the fitting portion 4 in the radiator grille, the hooked leading ends of the legs are inserted into a pair of fitting holes 16 formed in a flat portion 4' at the leading end of the fitting portion 4 with the legs 14 pushed outwardly as indicated by the dotted line in FIG. 2 and, after the hooks 15 have slid past these holes, the legs are allowed to resume their original shape and, consequently, the hooks are brought into fast engagement with the edges of the holes 16 so that the intervening portion 4" between the pair of fitting holes will be embraced between the hooks 15. Thus, the fastener 5 and fitting portion 4 in the radiator grille 4 are brought into tight engagement as illustrated in FIG. 6.

In any event, the fastener 5 and the fitting portion 4 in the radiator grille are desired to be attached to each other so fast that no slack will develop between them. For this purpose, it is naturally necessary to pay due consideration to the dimentional accuracy with which the fastener 5 and the fitting portion 4 are fabricated so that the distance separating the hooks 15 will exactly conform to the width of the intervening portion 4". Besides this precaution, it is likewise necessary to preclude possible occurrence of slack as by raising ribs 17 from the base plate 6 of the fastener on the side containing the second engaging means 8 and, at the same time, depressing the flat portion 4' to provide the fitting portion 4 with surfaces 18 adapted to come into tight contact with the outer surfaces of the ribs 17. Although in the illustrated embodiment, the depression has the general outline of a circle as also illustrated in FIG. 5 and the ribs 17 have their outer surfaces curved so as to fit snugly into the circular outline, they may be formed in matched rectangular or other shapes. An intermediate rib 19 adapted to give support to the portion 4" is provided on the fastener to enhance the strength of the portion 4".

The attachment of the radiator grille 1 to the automobile body 2 by use of such fasteners as described above is generally started with the work of fitting the fastener 5 to the radiator grille through the medium of the second engaging means 8.

After the fastener has been attached to the radiator grille by the engagement of the second engaging means 8 thereof with the fitting portion 4 in the radiator grille, the first engaging means 7 of the same fastener 5 is opposed exactly to the fitting hole 3 in the automobile body and then pressed together with the radiator grille toward the fitting hole 3. Consequently, the first engaging means 7 is allowed to pass through the fitting hole 3 while the flexible arm 11 thereof alone is bent by the edge of the fitting hole in the direction of the shank portion 9 of thick wall as indicated by the dotted line in the righthand portion of the diagram of FIG. 2. When the most extended portion of the arm 11 slides past the edge of the fitting hole, the arm 11 resumes its original shape by its resiliency own and, consequently, the subsequent engaging step portion 13 snaps into engagement with the edge of the hole together with the engaging step portion 13 of the thick-walled shank portion. Consequently, the fitting is completed as illustrated in FIG. 6.

Now, the effect of external forces exerted upon the fixing structure which has undergone the work of fitting will be described. When an external force $f_1$ is exerted downwardly upon the radiator grille, the corresponding reactive force $f_1'$ is exerted upon the shank portion 9 supported against the edge of the fitting hole 3 in the automobile body. This shank portion 9 is tough enough to withstand this force and prevent the external force $f_1$ from producing slack in the radiator grille.

In the case of an external force $f_2$ which is exerted upwardly upon the radiator grille as illustrated in FIG. 6, the force is transformed by the edge of the fitting hole in the automobile body 2 into a reactive force $f_2'$ tending to depress the flexible arm 11. Since the arm 11 has relatively high flexibility, it can readily be bent in the direction of the force. This means that, under the influence of this force, the radiator grille tends to move out of position.

This invention, therefore, contemplates giving the fixing structure an ability to withstand external forces exerted in all directions thereon by ensuring well balanced distribution of strength throughout the entire fixing structure.

Figure 7:
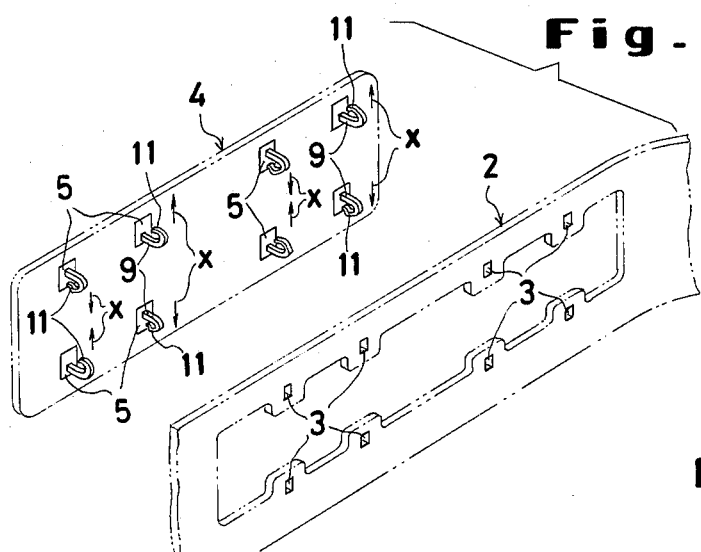
FIG. 7 is an explanatory diagram illustrating the plurality of fasteners of the fixing structure of the present invention as disposed in different directions prior to attachment.

Generally, the radiator grille 1 is fixed to the automobile body, as described above, by having several portions thereof securely fastened to the corresponding portions of the automobile body through the medium of as many fasteners 5 attached thereto. FIG. 7 is a model diagram illustrating the manner of the use of the fixing structure. In this illustrated embodiment, the radiator grille is depicted as being fixed to a total of eight fitting holes 3, four each in two horizontally parallel rows in the automobile body 2. Of the total of eight fasteners 5 to be engaged one each with the eight fitting holes 3, at least one is disposed in such a way that the arm 11 of the first engaging means thereof faces in a direction opposite the direction in which the arms 11 in the remaining fasteners face.

In FIG. 7, the arm 11 and the shank portion 9 in each fastener are schematically represented generally in the shape of a hooked line. In this case, the direction of the arms in the fasteners alternate in direction in the four vertical lines and the two arms in each vertical line face either toward each other or away from each other. In the case where the forces $f_1$, $f_2$ are exerted in two directions as illustrated in FIG. 6, therefore, while one fastener may be unable to resist the force $f_2$, another fastener whose arm faces in the opposite direction causes its solid shank portion 9 to offer ample resistance to this force. The fixing structure as a whole can withstand the forces $f_1$, $f_2$ exerted simultaneously in two directions thereon. In other words, the fasteners offer an advantage that, during their engagement with the corresponding fitting holes, their ample resiliency serves to facilitate the work of insertion and, after the engagement, their well-balanced distribution of strength ensures retention of tight union between the radiator grille and the automobile body.

It is, of course, permissible to use fasteners of this invention in the same relationship of opposite directions as previously described on each of the lateral sides of the radiator grille in addition to those used at the positions in the two horizontally parallel rows illustrated, so that the additional fasteners will serve the purpose of providing resistance to external forces exerted upon the radiator grille in all directions perpendicular to the direction of insertion. While the measure to have the fasteners arranged so that they alternate in the direction of the vertical lines proves advantageous, it is not necessarily an indispensable requirement. Moreover, the spirit of this invention applies similarly where the number of fasteners used is not the same as that illustrated in the diagram.

Further, when the fasteners are arranged as contemplated by this invention so that they alternate in their direction regularly in a fixed pattern, the overall resiliency offered by their arms 11 is dispersed in at least two opposite directions and, consequently, is used for the purpose of absorbing some degrees of deviation of the fasteners from the fitting holes 3 due to errors of fabrication.

When the individual fasteners are positioned in different directions as described above, the worker fixing the radiator grille to the automobile body will find it troublesome to bring the fasteners into engagement with the fitting holes in the radiator grille while confirming the directions of their arms one by one. It is, therefore, advantageous to avoid this trouble by providing on the base plates 6, for example, positioning (direction-fixing) projections 20 for guiding the fasteners and, at the corresponding positions on the fitting portions 4 of the radiator grille, matched positioning grooves 21 as in the illustrated embodiment. When the positions of these grooves 21 are alternated during the fabrication of the radiator grille by molding, these grooves will aid the worker in enabling the fasteners to be arranged in the alternating directions by simply matching the projections 20 of the fasteners with the corresponding grooves 21.

Figure 8:
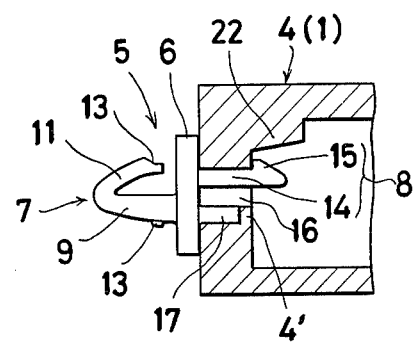
FIG. 8 is a side view of another fastener design usable in the radiator grille fixing structure of the present invention.

FIG. 8 illustrates another embodiment of the second engaging means intended for attachment to the radiator grille. In this embodiment, there is used only one leg 14 containing a hooked end 15. In the case of the preceding embodiment using two legs 14 in each fastener, the engagement between the radiator grille and the fastener can be broken by having a screw driver inserted between the legs and twisted. In the embodiment of FIG. 8, the part 22 of the fitting portion 4 of the radiator grille which is opposed to the hook is given an increased wall thickness. Again in this case, the engagement between the fastener and the radiator grille can be broken by twisting the tip of a screw driver inserted into the narrow space formed by the thick-walled part 22.

In the present embodiment, the rib 17 is formed in a relatively large size so as to be admitted fully into the thick-walled part of the flat portion 4' of the radiator grille with a view to enhancing the stability of engagement. Basically this embodiment is identical with the first embodiment in all the other respects. Thus, the other parts involved in this embodiment are denoted by the same symbols as those used in the first embodiment.

According to the present invention, a plurality of fasteners which are each provided with a flexible arm in one direction perpendicular to the direction of insertion are arranged so that their arms face in directions changed regularly in a fixed pattern when they are brought into engagement with the corresponding fitting holes as described above. Consequently, the radiator grille fixing structure of the present invention combines the convenience of the work of fastener attachment and the well-balanced distribution of strength against external forces exerted upon the radiator grille fixed on the automobile body.

What is claimed is:
1. A radiator grille fixing structure comprising a plurality of separate fasteners adapted to engage an array of apertures in a grille and a matching array of apertures in a car body, each of said fasteners comprising:
   (a) a base plate,
   (b) a first engaging means extending from one side of said plate adapted to be snapped into one of said apertures in said car body, said first means being substantially hook-shaped and including;
      (1) a solid shank portion with one end integrally formed with said base plate,
      (2) a flexible curved arm extending from the opposite end of said shank portion, said arm having a stepped catch near its free end,
   (c) a second engaging means extending from the opposite side of said base plate adapted to be snapped into engagement with one of said apertures in said grille, said second means including;

(1) a pair of resilient legs with oppositely directed hooks at the free ends thereof adapted to grip said grille,
(2) a rib on said base between said legs to abut and support a portion of said grilled engaged by said legs,
(3) tapering lateral support means disposed on said base and located radially outwardly from said legs to provide lateral contact between the fastener and the grille,
(4) a locating projection assymetrically disposed adjacent said support means to facilitate formation of a predetermined arrangement of said fasteners in said grille, whereby said fasteners support said grille in a fixed relation to said car body.

* * * * *